May 9, 1944.  H. J. G. RUDOLF  2,348,362
LIQUID LEVEL GAUGE
Filed Feb. 11, 1942  2 Sheets-Sheet 1
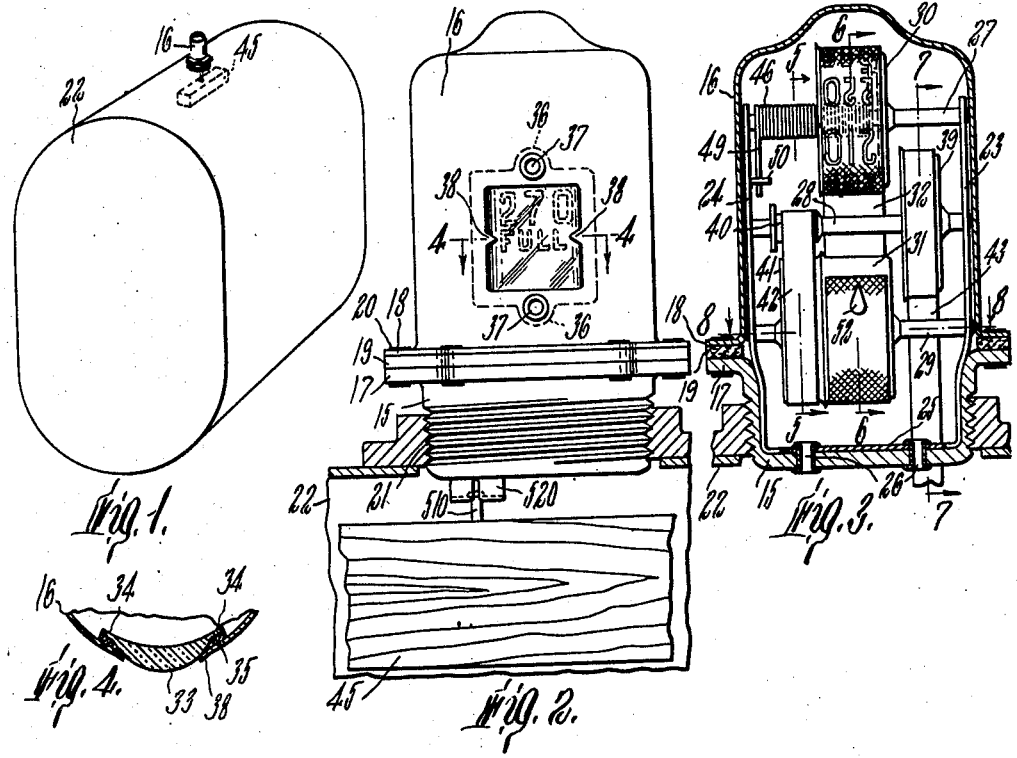
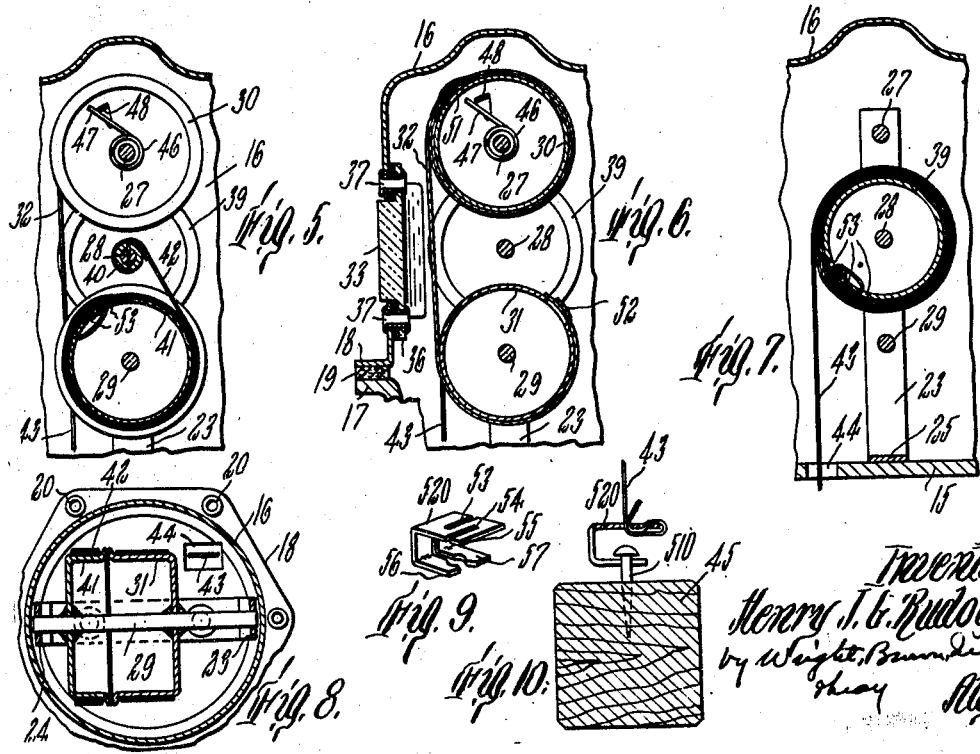

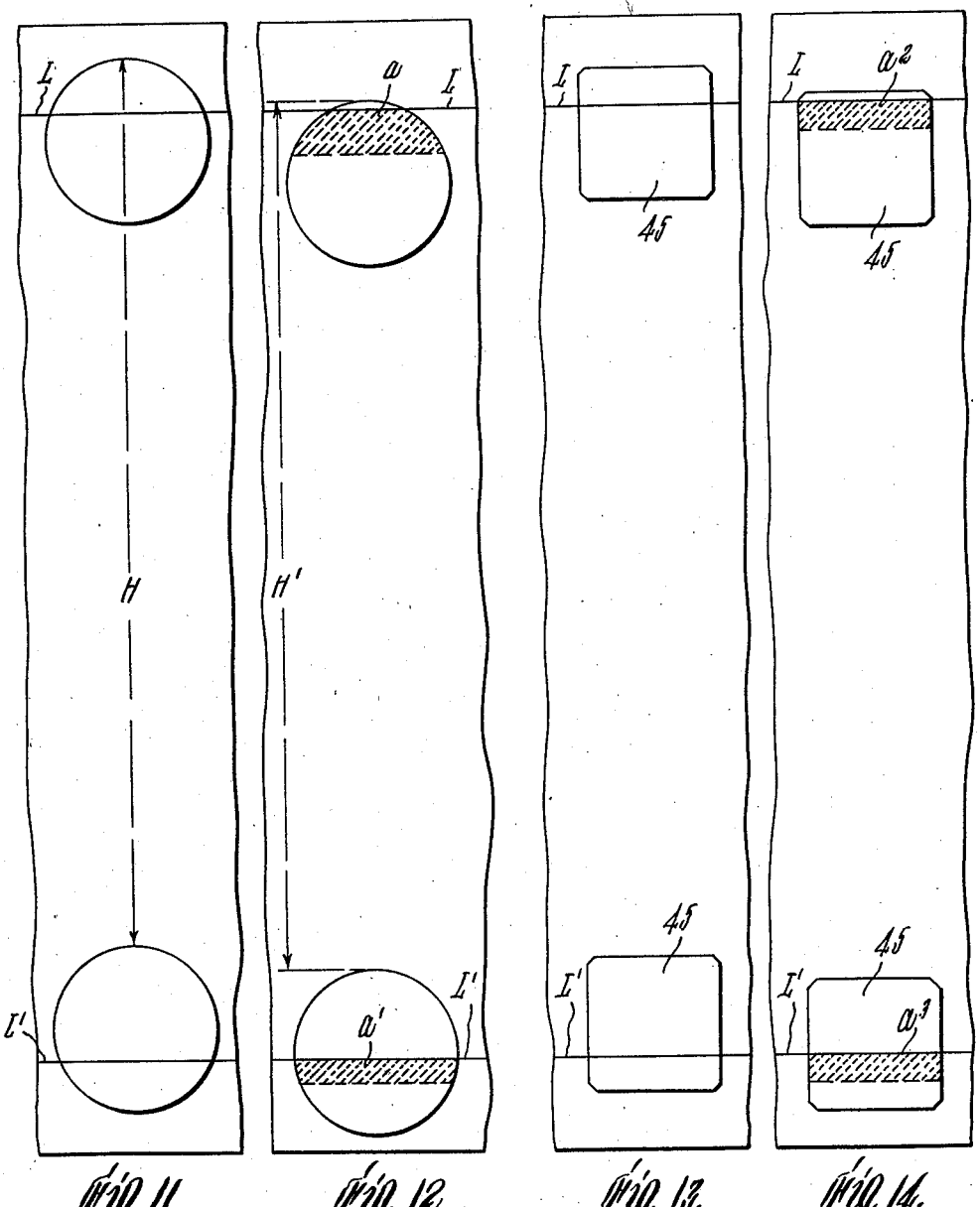

Patented May 9, 1944

2,348,362

UNITED STATES PATENT OFFICE 2,348,362

LIQUID LEVEL GAUGE

Henry J. G. Rudolf, Brookline, Mass., assignor to Applied Mechanics Co., Cambridge, Mass., a corporation of Massachusetts Application February 11, 1942, Serial No. 430,380

3 Claims. (Cl. 73—321)

The present invention relates to indicators adapted to be applied to tanks, and other containers holding liquids, for the purpose of showing the quanity of liquid therein. It is particularly intended and designed to show with a high quality of accuracy the actual quantity of liquid contained in the tank, in terms of gallons or other units of volumetric measure, rather than in terms of fractions of the depth of the tank occupied by the liquid. Still more particularly, it is concerned with gauges for the tanks furnished for domestic use to contain fuel oil for the burners of oil fired heating systems. In reference to tanks of this character, the object of the invention is to furnish a standard gauge or indicator, applicable to all the conventional tanks of a given capacity, which will show within a very small margin of error the quantity of oil contained in the tank at all the levels of the liquid, and which can be made in quantity production at low cost and sold to users at a moderate price. A very important factor of this object, which is accomplished by the invention, is to overcome or avoid the inevitable variations in minor details among individual instruments of the same design and capacity, and cause such instruments to make substantially identical indications, under like conditions of installation, regardless of such variations.

Some features of this invention are like or similar to particulars disclosed in a prior application for patent filed by me in the United States Patent Office on May 5, 1937, Serial No. 140,872, on which Patent No. 2,296,189 was granted September 15, 1942, entitled Liquid level indicators; wherefore the present application is a continuation in part of the prior one. It also embodies new features and improvements over the instrument shown in said prior application.

The novel characteristics and features of the invention for which protection is herein claimed are best explained with reference to a concrete embodiment, in the understanding that the invention includes all equivalents of the combinations and details shown and described. Such an illustrative embodiment is described in the following specification and shown in the accompanying drawings.

In the drawings:

Fig. 1 is a conventionalized perspective view of a fuel tank of the form and capacity now extensively used in connection with domestic oil burning heating plants, with a gauge or indicator containing this invention applied thereto;

Fig. 2 is a front elevation of the indicator as applied to a tank, showing the contiguous parts of the tank in section and showing also a fragment of the float by which the indicating element of the gauge is actuated;

Fig. 3 is a central vertical section of the instrument taken on a plane parallel to the front elevation projection and looking from the rear toward the front;

Fig. 4 is a detail cross section taken on line 4—4 of Fig. 2;

Figs. 5, 6 and 7 are vertical sections taken on lines 5—5, 6—6 and 7—7, respectively, of Fig. 3;

Fig. 8 is a horizontal section taken on line 8—8 of Fig. 3;

Fig. 9 is a detail perspective view of a coupling device, embodying one of the features of this invention, by which the float is connected to the tape or tension member which actuates the indicator;

Fig. 10 is a cross section of the float and of the coupling device shown in Fig. 9, in assembled relation;

Figs. 11, 12, 13 and 14 are diagrams illustrating one of the factors of utility of the form of float provided for actuating the indicating element of this instrument.

Like reference characters designate the same parts wherever they occur in all the figures.

The indicating element and mechanism for operating it are contained in a casing which consists of an externally threaded cup shaped plug 15 and a shell 16, having outwardly turned flanges 17 and 18, respectively, secured together, with a gasket 19 between them, by rivets 20 or the like. The plug is adapted to be screwed into an opening 21 provided for the purpose in the top of the standard fuel tank, such as that shown at 22 in Fig. 1; and to facilitate screwing it in, the registering flanges 17 and 18 are preferably made of hexagonal outline, or other non-circular outline suitable for engagement by a wrench.

Within the casing are two upright plates or bars 23 and 24 extending close beside the opposite side walls of the shell 16, and connected by a cross member 25 which extends across the upper side of the bottom wall of the cup 15 and is secured to such wall by rivets 26. These members 23, 24 and 25 are conveniently made of a single strip of sheet metal, bent into U-form, sufficiently stiff to support the shafts presently described, and sufficiently wide and thick to provide bearings for the extremities of such shafts.

The shafts referred to are shown at 27, 28 and 29, arranged with their axes horizontal (when the instrument is in its upright operative position), in descending series. The ends of these shafts occupy bearing holes in the uprights 23 and 24 and are nearly as long as the interior diameter of the shell 16, whereby the sides of the shell adjacent to the uprights provide stop means preventing the shafts from slipping endwise out of their bearings.

Shaft 27 carries a rigidly connected drum 30 and shaft 29 carries a rigidly connected drum 31. An indicator element 32 of tape formation is wrapped around the drums and secured at one end to the drum 30 and at the other end to the drum 31. This indicator tape is preferably, or conveniently, made of a strip of textile fabric, closely woven and sized so as to receive printed impressions without absorbing and spreading the ink, and to be non-stretching under the tension to which it is subjected in use. A length of the tape passes between the drums beside, and back of, the front wall of the shell 16 and across a window provided in such wall through which numbers and other insignia carried by the tape are visible.

One of the novel features of the invention, to which I now call attention, is a lens 33 mounted in the window above mentioned for the purpose of magnifying such numbers, etc. It is made of transparent plastic, preferably cellulose acetate, and has the approval of the Fire Underwriters, being unbreakable and substantially non inflammable. It is shaped to protrude through the window from within, and with margins 34 which overlap the bounding edges of the window. A gasket 35 is interposed between the overlapping margins of lens and window. The top and bottom margins of the lens are extended to provide lugs 36 through which, and the shell, rivets 37 are passed to hold the lens and gasket securely in place. The outer face of the lens, which protrudes through the window, has a cylindrical curvature, about a vertical axis, of shorter radius than the rear or inner face of the lens, whereby it magnifies the tape indications horizontally, but not vertically. Index projections 38 are formed on the opposite edges of the window, projecting toward each other at the same level.

The shaft 28 carries, at one side of the indicator tape, a relatively large drum 39 and, at the opposite side, a small drum or pulley 40; and the shaft 29 carries a drum or pulley 41 in the same zone with the small drum 40, and of substantially larger diameter than the latter. A transmission tape 42 is wrapped around, and secured at its opposite ends respectively, to the drums or pulleys 40 and 41; and a propelling tape 43 is wrapped around and secured at one end to the drum 39, passing thence through an opening 44 in the bottom of the casing to a connection with a float 45. The drums 39, 41 and 40 and the tapes 43 and 42 constitute a speed reducing belt drive through which connection is made between the float and the indicator-supporting drum 31. A spring 46 is coiled around the shaft 27 and engaged at one of its ends, 47, with an abutment 48 on the drum 30, while its opposite end 49 is engaged with an abutment 50 on the support 24. This spring is arranged to exert torque on the drum 30 in opposition to that exerted by downward pull of the tape 43 through the transmission means constituted by drums 39 and 40, tape 42, drums 41 and 31, and indicator tape 32, tending to wind up the indicator tape on drum 30 and the propelling tape on the drum 39. Its strength is sufficient to counterbalance a fraction of the weight of the float 45, not only when the oil level is low, but also when the float is raised to the highest point by filling of the tank.

The tapes 42 and 43 are made of non-corrodible metal which is strong and flexible, but not brittle, and are sufficiently thin to have a high degree of flexibility, such that they offer no appreciable resistance to bending around the several drums, even the drum 40 of smallest diameter. Phosphor bronze and beryllium copper are suitable metals for this purpose, and tapes no more than two thousandths of an inch thick and one quarter inch wide made of these metals are amply strong.

As a feature of inexpensive manufacture, the drums 30, 31, 39 and 41 are preferably made as sheet metal cups flanged outwardly at their rims, centrally perforated at their bottom or end walls to receive their respective shafts, and are secured to their shafts by soldered joints. Hooks 51 and 52 are struck out from the cylindrical walls of the drums 30 and 31 to anchor the indicator tape to those drums by passing through holes in the tape; and the abutment 48 is provided by a tongue struck inward from the end wall of drum 30. The drums 39 and 41 are each provided with three parallel spaced apart slits 53 in their cylindrical walls through which, respectively, one end of the tape 43, and correspondingly one end of tape 42, is passed and looped to anchor it beyond possibility of slipping. Drum 40 is a sleeve fitted and secured to shaft 28, having a flange at one end. The latter drum and the shaft have registering diametral slots through which the end of tape 42, opposite to the end which is fastened to drum 41, is passed and doubled back. The anchorages so provided for the several tapes are secure and readily made fast.

The fuel tanks with which the indicators or gauges of the design shown in these drawings are intended to be used have semi-cylindrical top and bottom portions joined by parallel vertical plane walls. Hence within such cylindrical portions of the tank, the depths of successive spaces of equal volumetric capacity are unequal, being greatest next to the top and bottom, and progressively less toward the junctions of the curves with the parallel sides of the tank. The figures on the indicator tape 32 are spaced and calibrated to correspond with the different heights of such spaces at different levels.

The float member of the instrument is made with a width and thickness small enough to pass through the opening provided in the tank for mounting the casing of the instrument, and in order to enlarge its horizontal area, when supported in part by the liquid, so that the difference between its depths of immersion when the tank is full, and nearly empty, respectively, may be as small as practicable, the float is made with substantially greater length than transverse dimensions and is coupled with the propelling tape 43 at a point between its ends so located that its length dimension will be approximately horizontal when it is suspended by the tape and immersed more or less in the liquid. Such differences in depth of float immersion at different liquid levels are caused by variations of tension of the spring; descent of the float causing the spring to be more tightly coiled, by operation of the transmission means, and rise of the float permitting the spring to be relaxed.

The float is made of wood because wooden floats are less expensive than those made of other materials and constructions, and they are, besides, durable and not subject to the liability of leaking and sinking and deformation to which hollow floats made of sheet metal are subject. Any kind of wood may be used. A new feature of the invention is that, before the float is assembled with the rest of the instrument, it is impregnated with oil to, as nearly as feasible, the saturation point. It may then be painted, although painting is not essential. The important advantage of this preliminary oil saturation is that the specific gravity of the float is made substantially invariable. The float will not, after extended use, become appreciably heavier by soaking up oil.

Although the weight of each individual float is thus made substantially invariable, nevertheless different floats may differ slightly in weight from one another, due to unequal density of the pieces of wood from which they are made, unequal absorptive capacity for oil, and other qualities. Also different springs may differ slightly from one another in strength and stiffness. In order to compensate for such differences, the float is given a rectangular prismatic formation with square ends, and is suspended from the operating tape 43 so that its side and end faces are vertical and its top and bottom surfaces horizontal, or approximately so, when the float is suspended from the tape and partially supported by the oil in the tank. By reason of this vertical disposition of sides and ends, all floats of the same dimensions, and all springs within the prescribed limits of tolerance, are interchangeable with one another in different instruments of the same design. No error is caused in the reading of an instrument by use of a float of greater or less weight than the prescribed value, or by a spring of greater or less stiffness, provided the float is neither so heavy or coupled with a spring so weak as to be completely submerged when the tank is full, nor so light or coupled with a spring so strong as to be held by the spring clear of the liquid when the tank is nearly empty.

The diagrams shown in Figs. 11–14 demonstrate the fact that a float with parallel sides, partially spring supported, compensates for variations of the character herein referred to, while floats with non parallel sides cause errors of reading in consequence of such variations.

In Figs. 11 and 12 a float of circular cross section is shown. The lines L and L' represent high and low levels of liquid in the tank. It is assumed that the float represented in Fig. 11 is of the prescribed or average weight, and that the spring has the prescribed strength. Although the height H between the high and low positions of the float is less than the height between the levels L and L', owing to the greater tension of the spring when the float is at the low level, the value of H is known, and the indicator element is calibrated to show correctly the quantities of liquid in the tank when the float is at these and other levels.

Fig. 12 shows the condition when a float of the same dimensions, but heavier than standard is substituted in the same instrument. It is more deeply immersed than the standard float at both high and low liquid levels, but its depth of immersion is relatively greater at the higher levels. These differences are graphically represented by the different heights of the shaded areas $a$ and $a'$, of which the lower boundaries represent the immersion planes of the standard float at corresponding levels. The height $H'$ between the positions of this float at the liquid levels L and L' is therefore different from the height H and the reading of the indicator element is correspondingly in error. The same kind of error is made if a lighter spring than standard is used. Errors in the opposite direction result when a float lighter than standard or a spring stronger than standard is applied to an instrument.

But with a float having plane vertical sides and ends, the wetted perimeter, or area in the plane of the liquid level, is the same whatever its depth of immersion, wherefore the volume of displacement is directly proportional to the depth of immersion, within the limits of the height of the vertical sides. Such floats are shown in Figs. 13 and 14; and the one shown in Fig. 14, being heavier than that shown in Fig. 13, is more deeply immersed than the lighter float by equal amounts at all levels. This is graphically indicated by the equality in depth of the shaded areas $a^2$ and $a^3$ in Fig. 14.

Still another valuable new feature is embodied in the swivel connection between the float 45 and tape 43. One member of the connection is a pivot 510 conveniently made of a simple nail or screw, having a cylindrical shank and a head on its end, which is driven into the top surface of the float substantially perpendicular thereto, and parallel to the sides of the float, and in approximate alinement with the center of gravity of the the float. The other member of the connection is a coupling 520 made conveniently of a strip of stiff sheet metal (preferably brass), bent into U form. One side of the U member is intersected from opposite edges by parallel slots 53 and 54. These slots are adapted to receive the end portion of the tape 43, a bight of which is passed into the slot 53, and then over the finger 55 provided between the slot 54 and the outer edge of the member. The other leg of the U member and a portion of the connecting web are divided by a deep slot into jaws 56 and 57 having a degree of flexibility sufficient for the purpose presently described. The entrance to the slot between these jaws is tapered from a width slightly larger to one slightly less than the diameter of the pivot 510, forming a contracted throat adapted to be passed over the pivot; and within this throat the jaws are recessed at opposite locations to receive and confine the pivot, but loosely enough so that the pivot may turn freely within the socket so made.

This coupling member is inexpensive to make, and it can be accurately connected in non-slipping connection with the tape, with the greatest of ease and rapidly by skilled operators. It is coupled to the pivot by simply passing the latter through the tapered throat of the jaws 56 and 57 into the enlarged socket within the throat. The head of the pivot overlaps the rim of the socket, preventing the pivot from slipping out endwise. The float can rotate freely without twisting the tape.

In order to distinguish the several tapes and drums from one another by distinctive names, the tape 43 has been called a propelling tape, and the drums 40 and 41 have been called pulleys. The tape 42 which is wrapped around the pulleys 40 and 41 may be called a belt. The belt drive constituted by the members 40, 41 and 42, although in principle similar to a belt and pulley drive, is more positive than the ordinary drive so termed, because its ends are anchored to the respective pulleys and it is wrapped in relatively opposite directions of wind about them, The indicator element 32, which in the construction disclosed is a woven tape, may be called a band, in further distinction from the other tapes. However, the scope in which I claim protection is not limited by the terms applied to these several members, and all substantial equivalents thereof are included within the scope of the claims.

What I claim and desire to secure by Letters Patent is:

1. An indicator instrument adapted for application to liquid containers to show values dependent on the height of the liquid level therein, comprising a casing having means for attachment to such a container and having a window in one side, an indicating unit consisting of a pair of drums and a flexible band wrapped in relatively opposite directions of wind about the respective drums of said pair extending from one to the other, said drums being supported rotatably in the casing with a portion of said band adjacent to said window, a third drum mounted rotatably independently of the before named drums, a propelling tape secured to and wrapped about said third drum extending to the exterior of the casing, a belt drive between said third drum and said indicator unit, consisting of a pulley mechanically connected with the third drum, a pulley mechanically connected with one of the pair of drums, a belt wrapped about said two pulleys for transmission of torque from one to the other when either is rotated, a spring engaged with the other one of said pair of drums and arranged to exert torque tending to wind up the band on that drum, and a float connected to said tape outside of the casing; the tape being wrapped about said third drum in the direction such that its withdrawal from the drum causes rotation of that drum with which said spring is engaged, through the belt and pulley transmission and the indicator band, oppositely to the direction of torque application by the spring.

2. An indicator instrument comprising a casing having a base portion adapted to be secured in an opening in the upper part of a liquid containing tank, an indicator element mounted in said casing, the casing having a window through which a portion of said indicator element is exposed to view, a spring connected to said element tending to move the same in one direction, a drum mounted rotatably in the casing and operatively connected to transmit movement to the indicator element, in opposition to the force application of said spring, when rotated in one direction, and to receive force from the indicator element tending to rotate it in the opposite direction, an elongated flexible propelling member wrapped about said drum in the direction to be wound up thereon when the drum is rotated by the indicator element, and to cause movement of the indicator when drawn off from the drum, said propelling member extending outwardly from the base portion of the casing, and a float having a length substantially greater than the diameter of said base portion and a rectangular cross section of dimensions less than said diameter, whereby to permit insertion of the float endwise through the tank opening, and means for suspending the float from said propelling member in a line passing approximately through its center of gravity, approximately perpendicular to its length dimension and approximately parallel to its opposite sides; the weight of the float being sufficient to draw off the propelling member against the resistance of the spring throughout the entire range of liquid levels for which the instrument is designed, and insufficient to submerge the float completely when the liquid level is at the upper limit of such range.

3. A gauge for attachment to a liquid containing tank to show values dependent on the height of liquid in the tank, comprising a casing having a base portion adapted to be mounted in an opening in the upper part of the tank, a drum mounted rotatably in the casing, a flexible elongated propelling member wrapped around the drum and extending thence through said base portion, a movable indicating element in the casing having indications of values related to heights of liquid in such tank, transmission means between said drum and indicator element operable to move the indicator element in one direction when the propelling member is drawn off from the drum, a spring operatively connected to the indicator element to apply force yieldingly thereto in opposition to the force applied by the propelling member when drawn off from the drum, a float of greater length and less transverse dimensions than the base portion of the casing, suspension means coupling the float to the propelling member externally of the casing, said suspension means being disposed substantially in line with the center of gravity of the float at approximately right angles with the length dimension of the float, and the opposite sides of the float being parallel and substantially vertical when the float is so suspended; the weight and specific gravity of the float being sufficient to draw off the propelling member from the drum, in opposition to the force of the spring, to the lower limit of measurement for which the instrument is designed, and to cause the float to be partially immersed in the liquid at all levels thereof, and being insufficient to submerge the float wholly when the liquid is at the upper limit of measurement, and the parallelism of the opposite sides of the float extending through a greater height than that between the immersion planes of the float at the high and low limits of measurable liquid levels.

HENRY J. G. RUDOLF.